United States Patent
Duranton et al.

(10) Patent No.: US 7,249,244 B2
(45) Date of Patent: Jul. 24, 2007

(54) DATA PROCESSING SYSTEM

(75) Inventors: Marc Duranton, Suresnes (FR); Laurent Pasquier, Asniére-sur-Seine (FR); Valérie Rivierre, Vincennes (FR); Qin Zhao, Charenton le Pont (FR)

(73) Assignee: NXP B.V., Eindhoven (NL)

( * ) Notice: Subject to any disclaimer, the term of this patent is extended or adjusted under 35 U.S.C. 154(b) by 211 days.

(21) Appl. No.: 10/510,587

(22) PCT Filed: Mar. 31, 2003

(86) PCT No.: PCT/IB03/01265

§ 371 (c)(1),
(2), (4) Date: Oct. 8, 2004

(87) PCT Pub. No.: WO03/085516

PCT Pub. Date: Oct. 16, 2003

(65) Prior Publication Data

US 2005/0154857 A1    Jul. 14, 2005

(30) Foreign Application Priority Data

Apr. 10, 2002 (FR) .................. 02 04462

(51) Int. Cl.
*G06F 9/312* (2006.01)
*G06F 12/04* (2006.01)
(52) U.S. Cl. .................................. 712/225
(58) Field of Classification Search .......... 712/225; 711/149
See application file for complete search history.

(56) References Cited

U.S. PATENT DOCUMENTS

| 5,754,875 | A | 5/1998 | Getzlaff et al. |
| 5,862,154 | A * | 1/1999 | Pawlowski ............. 714/763 |
| 6,343,356 | B1 | 1/2002 | Pechanek et al. |
| 6,556,495 | B2 * | 4/2003 | Condorelli et al. ....... 365/221 |
| 6,715,041 | B2 * | 3/2004 | Avraham ................. 711/149 |
| 2003/0172243 | A1 * | 9/2003 | Ripley .................... 711/202 |

FOREIGN PATENT DOCUMENTS

WO    WO 01 52060    7/2001

OTHER PUBLICATIONS

Dutta S et al: "Architecture and Implementation of a High-Definition Video Co-Processor for Digital Television Applications" VLSI Design, 2000. Thirteenth Intl. Conf. on Calcutta, India Jan. 3-7, 2000, Los Almamitos, CA, USA, IEEE Comput. Soc. US. Jan. 3, 2000 pp. 350-355.

* cited by examiner

*Primary Examiner*—William M. Treat

(57) ABSTRACT

The invention relates to a processing system comprising a calculation device comprising at least one calculation unit (13), a storage device and a system for switching between the storage device and the calculation device. In order to reduce the size of the switching system, the storage device comprises several banks of registers (21, 22) for storing words, the switching system comprises at least one switching device (24) associated with each bank of registers and the calculation units exchange a word with a bank of registers by means of the associated switching device.

7 Claims, 11 Drawing Sheets

DATA PROCESSING SYSTEM

FIELD OF THE INVENTION

The present invention relates to a processing system comprising a calculation unit, a storage device and a system for switching between the storage device and the calculation unit.

The invention finds an application, for example, in a video data processing system. For example, an image reproduction processor can constitute such a video data processing system. This image reproduction processor can be included, for example, in a decoder, a decoding receiving device for television (a "Set Top Box") or a television.

BACKGROUND OF THE INVENTION

Many processing systems comprise one or more calculation units intended to perform operations on data. These calculation units can exchange words comprising the data with a storage device in which said words are stored. To do this, a switching system (a "crossbar system") is used in order in particular to direct the words coming from the storage device to a suitable calculation unit. The publication "Architecture and Implementation of a High-Definition Video Co-Processor for Digital Television Applications" by Santanu Dutta et al., published in January 2000, describes an example of such a processing system.

This processing system comprises a bank of registers constituting the storage device and comprising register reading ports and register writing ports, calculation units comprising calculation unit input ports and calculation unit output ports, and a reading and writing switching system comprising a reading switching system and a writing switching system. An exchange of words can be effected from a register reading port to a calculation unit input port, by means of the reading switching system; this is then a reading. An exchange of words can also be effected from a calculation unit output port to a register writing port, by means of the writing switching system. This is then a writing.

The term "calculation unit port" will hereinafter be applied indifferently to a calculation unit input or output port, "register port" to a register reading or writing port and "switching system" to a reading or writing switching system. In addition, the term "exchange" applies to a reading or writing of words.

In such a processing system, the switching system is implemented by means of multiplexers. The size of the switching system depends on the number of multiplexers used. The number of multiplexers depends on the number of register ports and calculation unit ports between which words may be exchanged, and the size of the words exchanged. In this processing system, the size of the words exchanged is large, and the words can be exchanged between all the register ports and all the calculation unit ports, by means of the switching system.

FIG. 1 illustrates a processing system according to the state of the art. Such a processing system comprises a storage device 10, a reading switching system 11, a writing switching system 12, and first, second, third and fourth calculation units 13 to 16. The storage device 10 comprises six register reading ports, for example rrp1 and rrp6, and four register writing ports, for example wrp1 and wrp4. The calculation units comprise calculation unit input ports, for example iup1 and iup2, and calculation unit output ports, for example eup5.

In this example, the words exchanged are words of P bits. Let it be assumed that the first calculation unit 13 wishes to read a data item stored in the storage device 10, on its calculation unit input port rup1. A control device, not shown in FIG. 1, indicates to the storage device 10 that it must send this data item over one of its reading ports, for example the port rrp1. This data item is then sent to the reading switching system 11, which is responsible for sending the data item to the calculation unit input port rup1. To do this, the reading switching system 11 comprises multiplexers. The control device sends control signals to the multiplexers, in order to direct the data item to the calculation unit input port iup1.

In such a processing system, all the register reading ports are connected to all the calculation unit input ports by means of the reading switching device 11. The expression "two ports are connected" means that an exchange of words is possible between these two ports. In FIG. 1, only a few connections have been shown, for reasons of clarity. If:
the number of register reading ports is termed m;
the number of calculation unit input ports is termed n, and
the number of bits of the words exchanged is termed P,
the number of multiplexers of the reading switching device is n(m−1)P.

For the writing switching device, the functioning is the same. If:
the number of calculation unit output ports is termed m';
the number of register writing ports is termed n', and
the number of bits of the words exchanged is termed P,
the number of multiplexers of the writing switching device is n'(m'−1)P.

The number of multiplexers therefore depends in particular on the number of bits of the words exchanged. However, the words exchanged have a size of P bits, whilst certain calculation units perform certain operations on data of a lesser size, for example P/N bits. When a calculation unit wishes to read a data item P/N bits, the storage device sends to it a word of P bits comprising this data item. Consequently, during such an exchange, (N−1)P/N bits are not used by the calculation unit.

This results in the size of the switching system being large. This presents a drawback, since the switching system is bulky. Because of this, the number of calculation units and calculation unit ports is limited, since the switching system cannot occupy more than a predefined surface area.

OBJECT AND SUMMARY OF THE INVENTION

It is an object of the invention to propose a processing system in which the size of the switching system is reduced.

A processing system according to the invention and as defined in the opening paragraph is characterized in that:
the storage device comprises several banks of registers;
the switching system comprises at least one switching device associated with each bank of registers;
the calculation unit is able to communicate with at least two banks of registers by means of the associated switching devices.

According to the invention, the words stored in the banks of registers have a lesser size than in the state of the art, for example P/N bits. The data on which the calculation units can perform operations have sizes of P/N, 2P/N, . . . (N−1)P/N or P bits for example. When a calculation unit wishes to read a data item of P/N bits, a first bank of registers comprising this data item sends to it the corresponding word of P/N bits, by means of the switching device (the "crossbar") which is associated with it. When it wishes to read a data item of 2P/N bits, the first bank of registers comprising the first P/N bits of this data item sends to it the corresponding word over one of its calculation unit ports, by means of the switching device associated with this first bank of registers, and a second bank of registers comprising the following P/N bits of the data item sends to it the corresponding word over one of its other calculation unit ports, by means of the switching device associated with this second bank of registers. A similar reasoning applies when the calculation unit wishes to read a data item of a greater size.

By virtue of the invention, certain banks of registers may have a lesser number of register ports than the storage device of the state of the art. This will be described in further detail hereinafter. Likewise, it is possible to omit certain connections between certain register ports and certain calculation unit ports. This will also be described in more detail hereinafter. Consequently it is possible to use a lesser number of multiplexers and thus reduce the size of the switching system.

In a preferred embodiment of the invention, the calculation unit comprises at least one port and the switching system also comprises a common switching device by means of which the port of the calculation unit can communicate with several registers. According to this embodiment, one and the same calculation unit port is able to exchange words with several registers.

In an advantageous embodiment of the invention, the calculation unit comprises at least one port, said port being able to communicate with a single bank of registers. According to this embodiment, the exchange of a word between a calculation unit port and a bank of registers is made solely by means of the switching device associated with this bank of registers. This embodiment makes it possible to dispense with a switching device common to several banks of registers.

In this way, the number of multiplexers used in the switching system is reduced. Thus the size of the switching system is reduced.

BRIEF DESCRIPTION OF THE DRAWINGS

The invention will be further described with reference to examples of embodiments shown in the drawings to which, however, the invention is not restricted.

FIG. 3a illustrates an example embodiment of a processing system according to the state of the art and FIG. 3b illustrates a processing system according to the invention for replacing the processing system of FIG. 3a;

DESCRIPTION OF PREFERRED EMBODIMENTS

Figure 2:
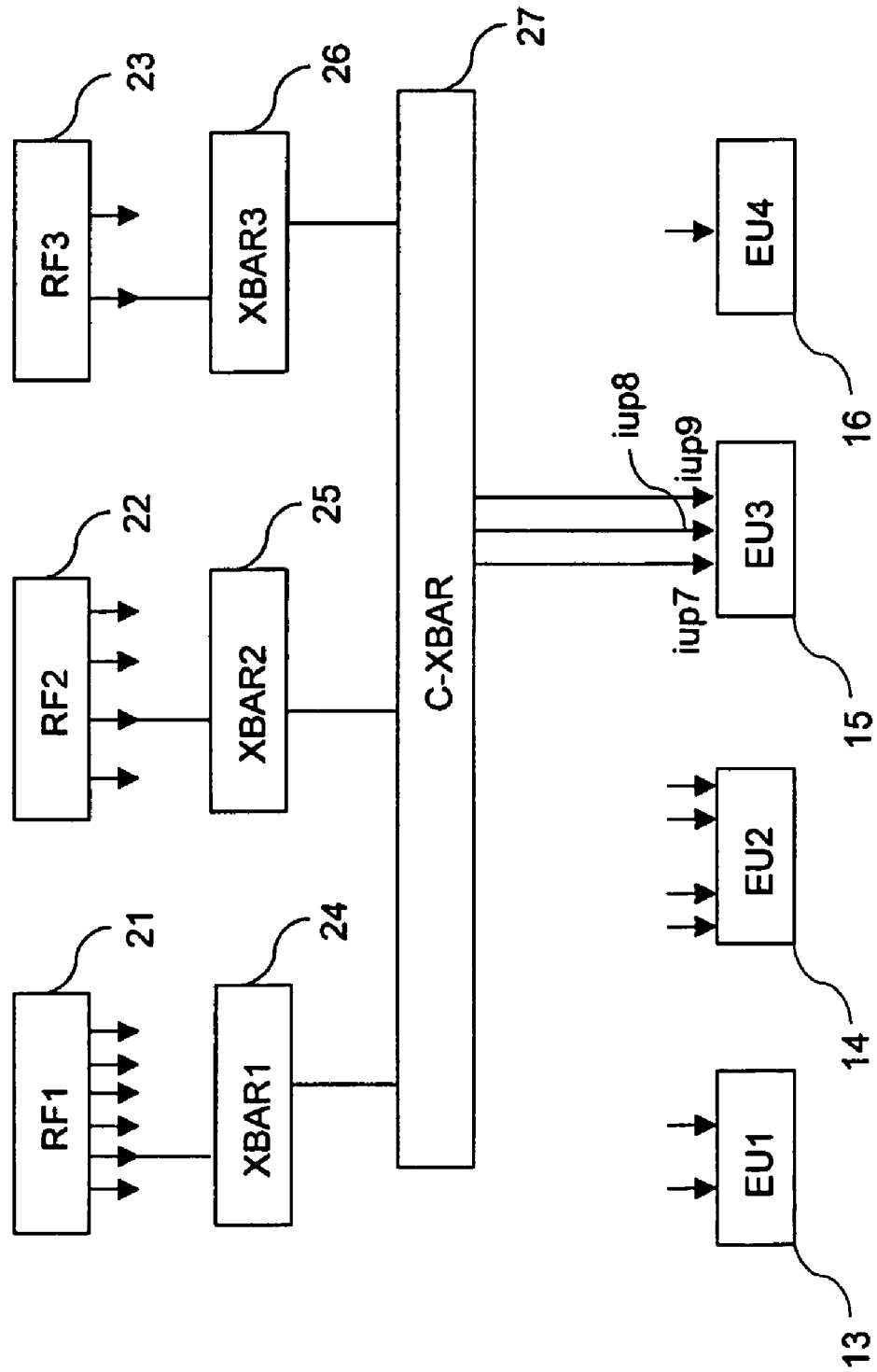
FIG. 2 is a block diagram illustrating characteristics of a processing system according to the invention.

FIG. 2 illustrates an example of a processing system according to the invention. Such a processing system comprises a first bank of registers 21, a second bank of registers 22, a third bank of registers 23, a first switching device 24, a second switching device 25, a third switching device 26, a first common switching device 27, and the first, second, third and fourth calculation units 13 to 16.

The switching devices depicted in FIG. 2 are reading switching devices. FIG. 2 therefore illustrates a data reading by the calculation units 13 to 16. The invention applies in the same way to a writing of data from the calculation units to the banks of registers, that is to say for writing switching devices.

The first, second and third banks of registers 21 to 23 store smaller words than in the state of the art, for example words of P/N bits. For this example, it is considered that P is equal to thirty-six and N is equal to three. The words exchanged are therefore words of twelve bits. Let it be assumed that the third calculation unit 15 wishes to read a data item of thirty-six bits in the storage device consisting of the three banks of registers 21 to 23. The first twelve bits of this data item are stored in the first bank of registers 21, the following twelve bits in the second bank of registers 22 and the last twelve bits in the third bank of registers 23. The third calculation unit comprises three calculation unit ports iup7, iup8 and iup9.

The first bank of registers 21 sends the first twelve bits of the data item to the first switching device 24, which sends these first twelve bits to the first common switching device 27, which sends these first twelve bits to the port iup7. The second bank of registers 22 sends the following twelve bits to the second switching device 25, which sends these following twelve bits to the first common switching device 27, which sends these following twelve bits to the port iup8. The third bank of registers 23 sends the last twelve bits of the data item to the third switching device 26, which sends these last twelve bits to the first common switching device 27, which sends these last twelve bits to the port iup9.

It is also possible that a calculation unit, for example the second calculation unit 14, may wish to read simultaneously three data items of twelve bits, or one data item of twelve bits and one data item of twenty-four bits. In these two cases, no word is read in the third bank of registers 23. Consequently, if the data items read frequently have a size of twelve or twenty-four bits, it is possible to reduce the number of register ports of the second bank of registers 22 and of the third bank of registers 23, compared with the number of register ports of the state of the art.

Consider an example where the calculation units 13 to 16 wish to read simultaneously 4 data items of twelve bits, one data item of twenty-four bits and one data item of thirty-six bits.

Figure 1:
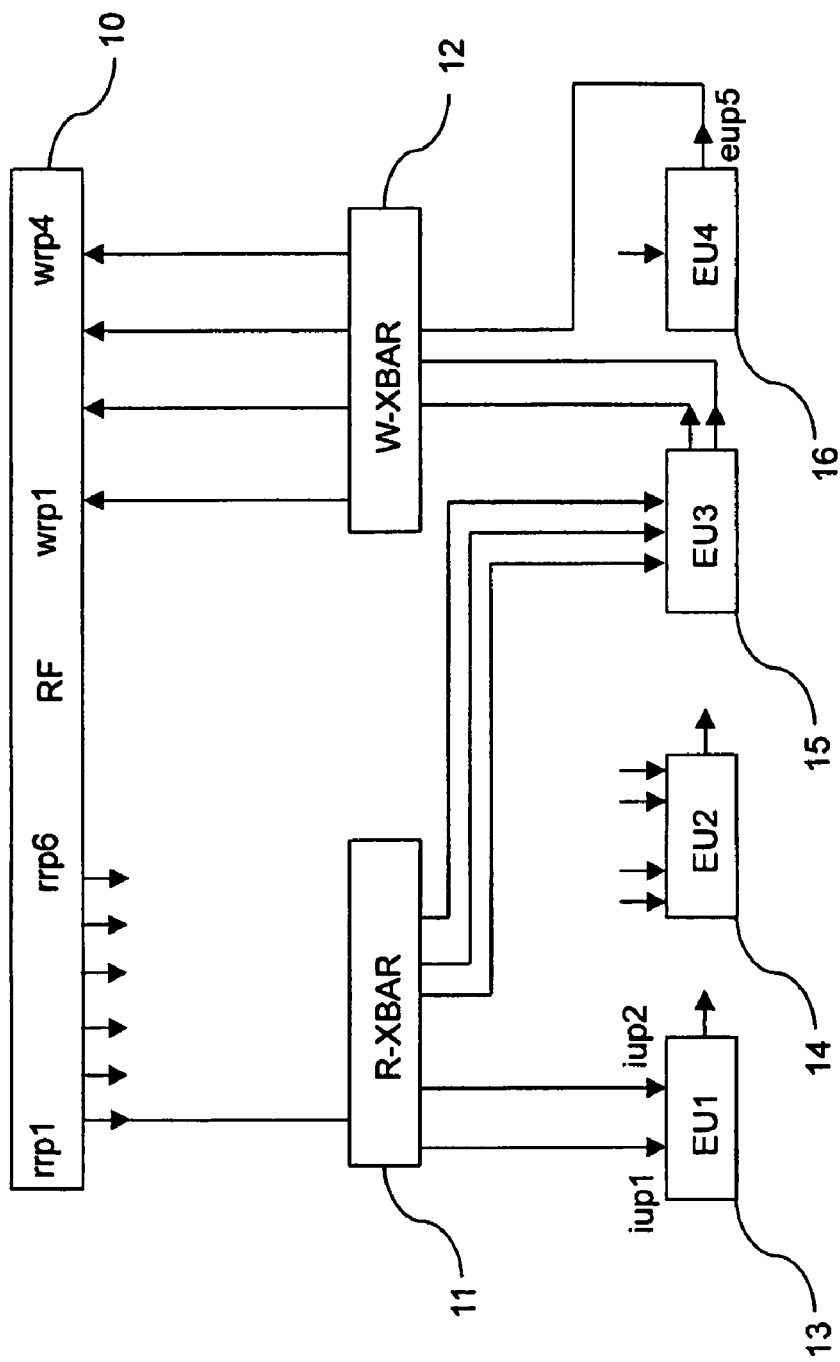
FIG. 1 is a block diagram illustrating characteristics of a processing system according to the state of the art.

The storage device 10 of the state of the art described in FIG. 1 must then send six words of thirty-six bits. It therefore requires six register ports of thirty-six bits.

With the processing system of FIG. 2, where the first bank of registers 21 has six register ports, the second bank of registers 22 has four register ports and the third bank of registers 23 has two register ports, it is possible, for the storage device consisting of the banks of registers 21 to 23, to send simultaneously four data items of twelve bits, one data item of twenty-four bits and one data item of thirty-six bits. Thus, with a number of register ports, with certain banks of registers, less than the number of register ports of the state of the art, it is possible to send simultaneously the same data items as in the state of the art. Consequently, by virtue of the invention, it is possible to reduce the number of ports of certain banks of registers.

Naturally, with the processing system of FIG. 2, it is not possible to send simultaneously six data items of thirty-six bits. However, such a situation is rare or even non-existent in many processing systems of the state of the art, which makes it possible to implement the invention in order to replace the majority of processing systems according to the state of the art.

Consequently, provided that, amongst data which are to be exchanged simultaneously, some have a size less than thirty-six bits, it is possible to reduce the number of register ports of at least one bank of registers, compared with the number of register ports of the state of the art.

In FIG. 2, only a few connections have been depicted for reasons of clarity. For example, all the register ports can be connected to all the calculation unit ports. If:

the number of register ports of the first bank of registers 21 is termed m1;
the number of register ports of the second bank of registers 22 is termed m2;
the number of register ports of the third bank of registers 23 is termed m3;
the total number of calculation unit ports is termed n;
the number of multiplexers of the switching system, consisting of the three switching devices 24 to 26 and the first common switching device 27, is equal to: n(m1+m2+m3−1)P/3.

Since (m1+m2+m3) is less than (3m−2), as is the case in the processing system in FIG. 2, the number of multiplexers in the switching system is less than the number of multiplexers required in the state of the art described in FIG. 1. Consequently the invention makes it possible to reduce the size of the switching system.

In order to reduce the size of the switching system further, it is also possible to omit certain connections between certain register ports and certain calculation unit ports. This is because, in the example cited above, the third bank of registers 23 never exchanges data with the calculation unit ports iup7 and iup8 of the third calculation unit 15. Consequently it is possible to omit the connections between the register ports of the third bank of registers 23 and the calculation unit ports iup7 and iup8, that is to say four connections. If X connections in all are omitted, the number of multiplexers in the switching system is equal to: [n(m1+m2+m3−1)−X]P/3.

Consequently the processing system according to the invention makes it possible to reduce the size of the switching system in two ways. The first way consists of taking, for certain banks of registers, a number of ports less than the number of ports of the storage device of the state of the art. The second way consists of omitting certain connections between certain register ports and certain calculation unit ports. These two ways of reducing the size of the switching system can be implemented separately or conjointly.

It should be noted that the banks of registers according to the invention do not necessarily all have the same size. For example, in order to replace the storage device 10 of the state of the art, when this storage device 10 stores words of thirty-six bits, it is possible to take a bank of registers of twenty-four bits and a bank of registers of twelve bits.

It should be noted that a data item of twelve bits is not necessarily stored in the first bank of registers 21. For example, data items of twelve bits can be stored either in the first bank of registers 21, the second bank of registers 22 or the third bank of registers 23. In this case, it is possible to reduce the number of the ports of each of the three banks of registers 21 to 23, as stated in FIGS. 3a and 3b.

Figure 3B:
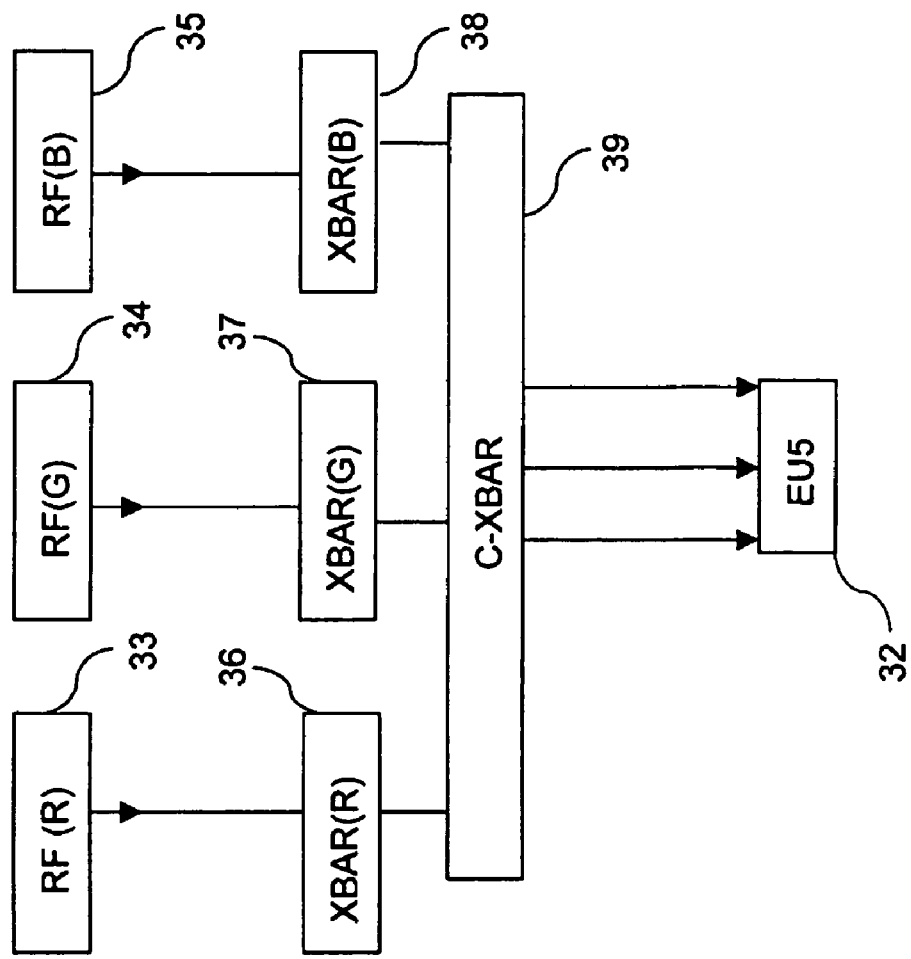
Figure 3A:
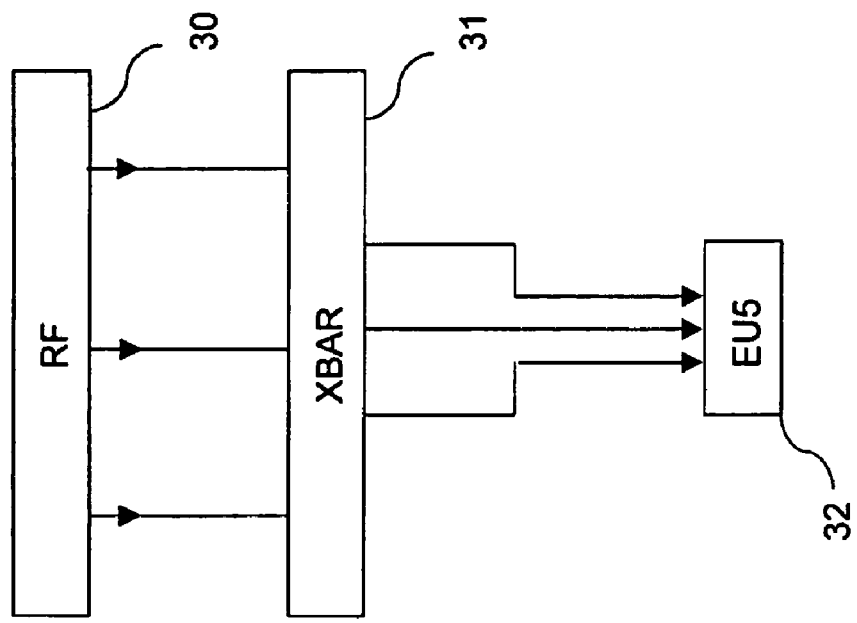

FIG. 3a illustrates an example of an implementation of a processing system according to the state of the art. This processing system comprises a storage device 30 having three register ports, a switching device 31 and a fifth calculation unit 32.

The data to be exchanged are data of twelve bits, which correspond to red, green and blue components of a pixel of an image. These data are stored in the form of words of twelve bits. The fifth calculation unit 32 needs to read simultaneously the red component, the green component and the blue component, but does not need to read simultaneously three red components for example. Each of the ports of the storage device 30 can send either a red, a green or a blue component. The switching device 31 therefore comprises, in this example, 3*(3−1)*12=72 multiplexers.

FIG. 3b illustrates an example of an embodiment of a processing system according to the invention, for replacing the processing system of FIG. 3a. This processing system according to the invention comprises a fourth bank of registers 33, a fifth bank of registers 34, a sixth bank of registers 35, a fourth switching device 36, a fifth switching device 37, a sixth switching device 38, a second common switching device 39 and the fifth calculation unit 32.

The banks of registers 33 to 35 each comprise a twelve-bit port. The fifth calculation unit 32 comprises three twelve-bit ports. The red component is stored in the fourth bank of registers 33, the green component is stored in the fifth bank of registers 34 and the blue component is stored in the sixth bank of registers 35. Consequently, with the processing system of FIG. 3b, the fifth calculation unit 32 can read simultaneously the red, green and blue components. The processing system of FIG. 3b can therefore replace the processing system of FIG. 3a.

If it is assumed that words can be exchanged between all the register ports and all the calculation unit ports, the switching system consisting of the fourth switching device 36, the fifth switching device 37, the sixth switching device 38 and the second common switching device 39 comprises 3*(3−1)*12=72 multiplexers, that is the same number as in the state of the art consisting of the processing system of FIG. 3a.

However, it has been seen that the fifth calculation unit 32 needs to read simultaneously the red component, the green component and the blue component, but does not need to read simultaneously three red components for example. Consequently it is possible to omit a large number of connections. For example, it is possible to omit the connections between the register ports of the fifth and sixth banks of registers 34 and 35 and a calculation unit port of the fifth calculation unit 32, that is to say one of the calculation unit ports of the fifth calculation unit 32 can read only red components. This therefore makes it possible to reduce the size of the switching system compared with the switching system 31 of FIG. 3a.

It should be noted that, in the example in FIG. 3b, the banks of registers 33 to 35 have only one register port. The switching devices 36 to 38 therefore have no multiplexers. Consequently a switching device according to the invention can comprise one or more multiplexers, or can be composed solely of physical links, for example wires.

Figure 4:
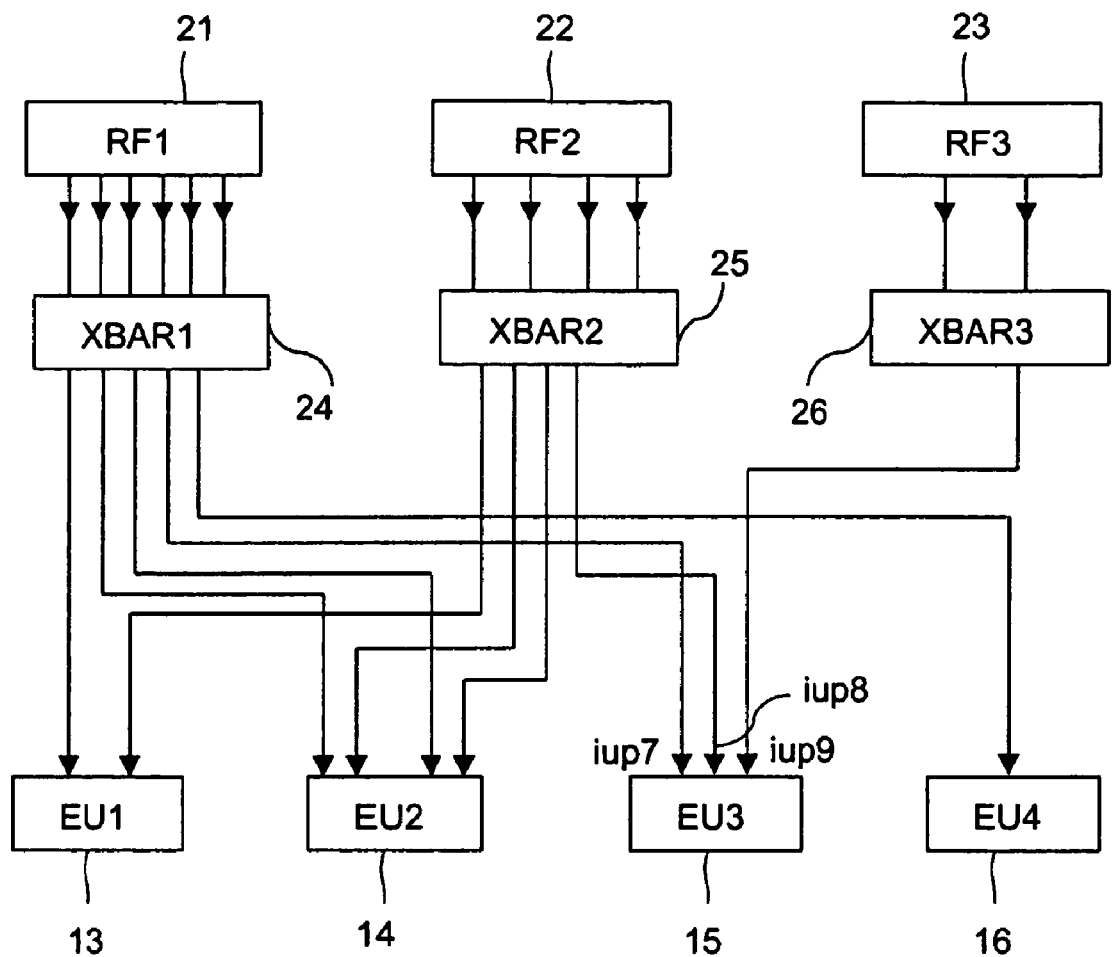
FIG. 4 illustrates an example of a processing system according to an advantageous embodiment of the invention.

Moreover it possible, as will be seen in more detail in FIG. 4, to associate each port of the fifth calculation unit 32 with a given bank of registers. For example, it is possible to connect the first port of the fifth calculation unit 32 to the fourth bank of registers 34, the second port of the fifth calculation unit 32 to the fifth bank of registers 35 and the third port of the fifth calculation unit 32 to the sixth bank of registers 36. In this way it is possible to dispense with the second common switching device 39.

FIG. 4 illustrates a processing system according to an advantageous embodiment of the invention. Such a processing system comprises the first, second and third banks of registers 21 to 23, the first, second and third switching devices 24 to 26, and the first, second, third and fourth calculation units 13 to 16. In FIG. 4, all the connections necessary to the functioning of this processing system between the register ports and the calculation unit ports have been depicted. In this advantageous embodiment, a calculation unit port can exchange words with only one bank of registers. For example, the port iup7 of the third calculation unit 15 can exchange words only with the register ports of the first bank of registers 21.

If each calculation unit port can exchange words with only one bank of registers, as is the case in FIG. 4, it is possible to omit the common switching device of FIG. 2, which in particular reduces the complexity of the processing system.

FIGS. 5 to 11 illustrate an example of the use of a processing system according to the invention in an image reproduction processor. There exist various formats for a display of video data. For example, an American digital television standard ATSC defines eighteen different broadcasting formats, such as the standard format where an image comprises 480 lines each of 720 pixels, or the high-definition format in which an image comprises 1080 lines each of 1920 pixels. When the video data are broadcast to the high-definition format, it is necessary to convert them to the standard format in order to be able to display them on a television whose screen is not compatible with the high-definition format. An image reproduction processor makes it possible in particular to make such a conversion.

Figure 5:
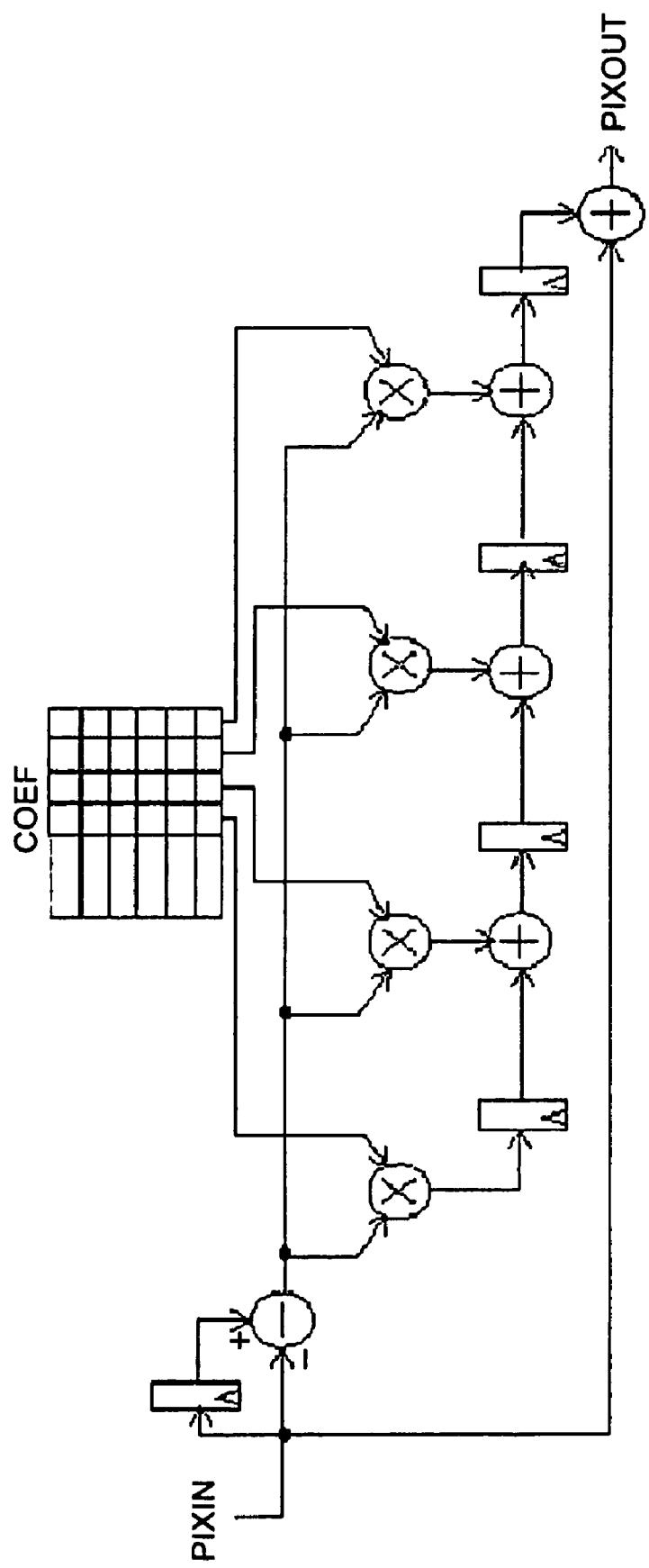
FIGS. 5 to 11 illustrate an example of the use of a processing system according to the invention in an image reproduction processor.

FIG. 5 illustrates a polyphase filter used in such an image reproduction processor. A polyphase filter of this type calculates output values PIXOUT of pixels from input values PIXIN of pixels and coefficients COEF. If five values of input pixels P1, P2, P3, P4, P5 are considered, and four coefficients c1, c2, c3 and c4, the polyphase filter calculates the value P of an output pixel defined by: $P=c1(P2-P1)+c2(P3-P2)+c3(P4-P3)+c4(P5-P4)$ FIGS. 6 to 11 illustrate processing steps performed by a processing system according to the invention in order to use such a polyphase filter. A processing system of this type comprises a seventh bank of registers 601, an eighth bank of registers 602, a ninth bank of registers 603, a tenth bank of registers 604, a seventh reading switching device 605, a seventh writing switching device 606, an eighth reading switching device 607, an eighth writing switching device 608, a ninth reading switching device 609, a ninth writing switching device 610, a tenth reading switching device 611, a sixth calculation unit 612, a seventh calculation unit 613, an eighth calculation unit 614, a ninth calculation unit 615, a common reading switching device 616 and a common writing switching device 617. For reasons of clarity, the common reading switching device 616 is not shown in FIGS. 7, 9 and 11 and the common writing switching device 617 is not shown in FIGS. 6, 8 and 10.

The values of the input pixels and of the coefficients are coded in twelve bits. The values of the input pixels are stored in the seventh bank of registers 601 and the coefficients are stored in the tenth bank of registers 604.

Figure 6:
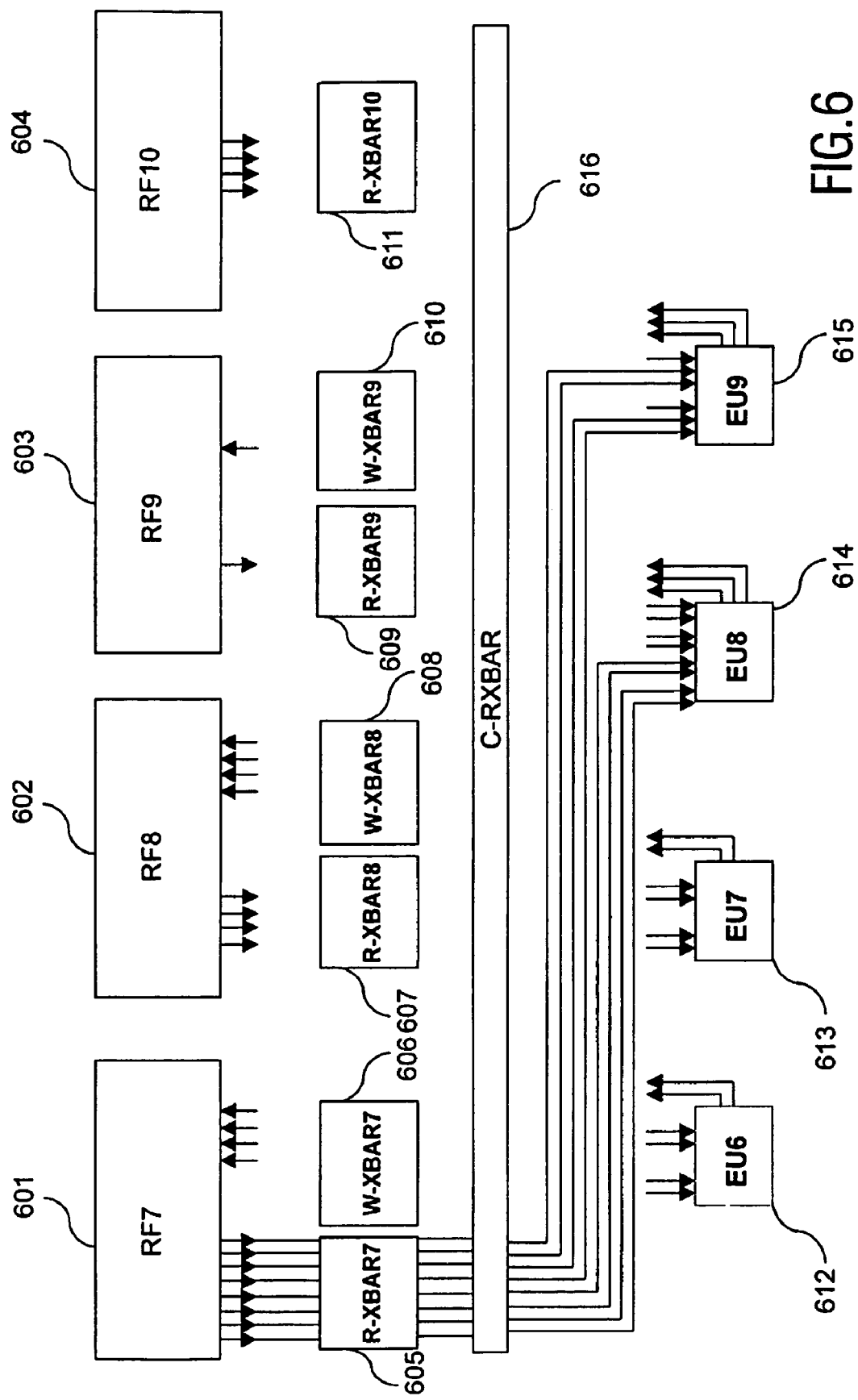

In a first step illustrated in FIG. 6, the following processings are performed simultaneously:
The values of the pixels P1 and P2 are sent to first and second input ports of the eighth calculation unit 614.
The values of the pixels P2 and P3 are sent to third and fourth input ports of the eighth calculation unit 614.
The values of the pixels P3 and P4 are sent to first and second input ports of the ninth calculation unit 615.
The values of the pixels P4 and P5 are sent to third and fourth input ports of the ninth calculation unit 615.

Next the eighth calculation unit 614 calculates the values (P2−P1) and (P3−P2) and the ninth calculation unit 615 calculates the values (P4−P3) and (P5−P4).

Figure 7:
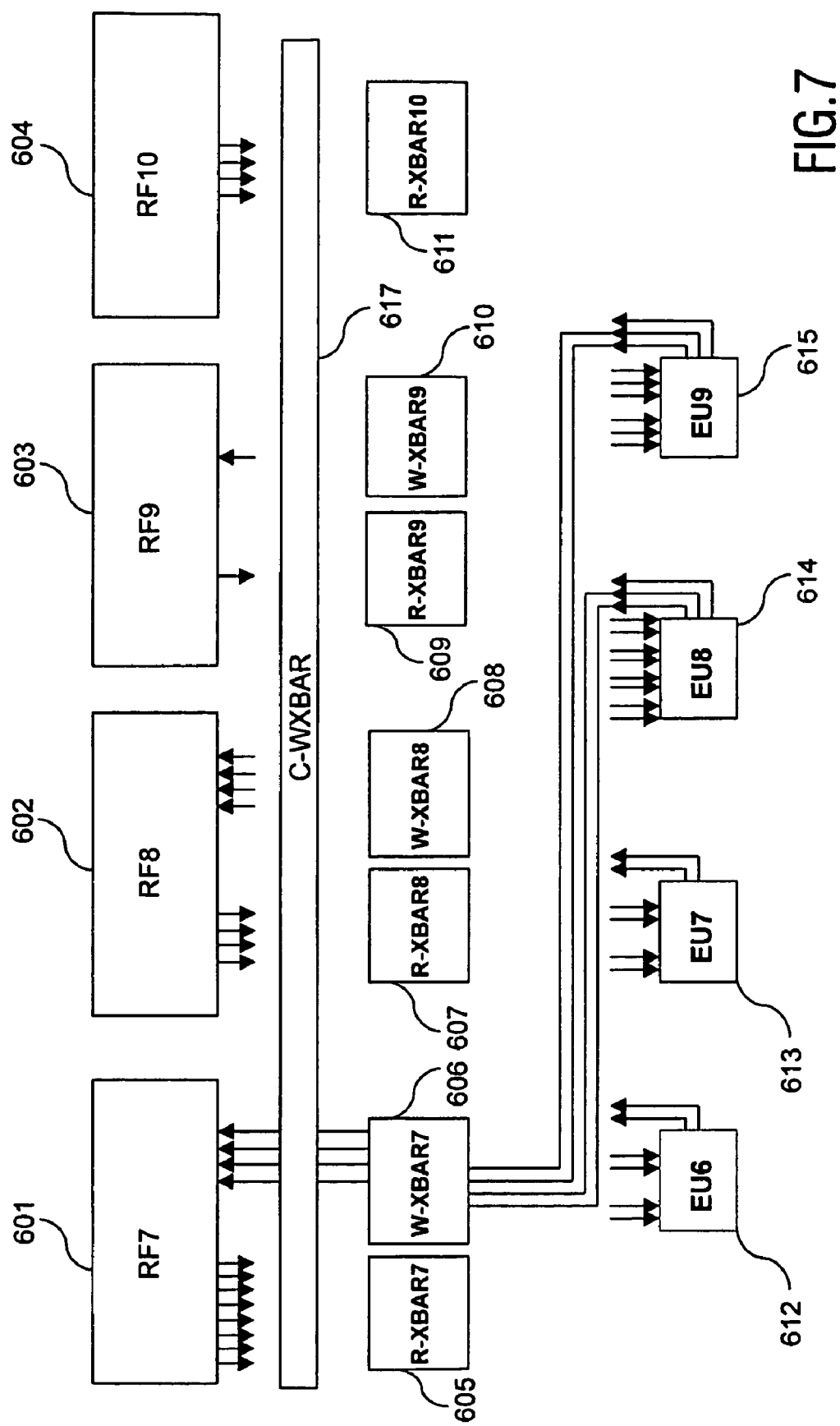

In a second step illustrated in FIG. 7, the following processings are performed simultaneously:
The value (P2−P1), which is a data item of twelve bits, is sent to a first writing port of the seventh bank of registers 601.
Likewise the values (P3−P2), (P4−P3) and (P5−P4) are sent to second, third and fourth writing ports of the seventh bank of registers 601.

Figure 8:
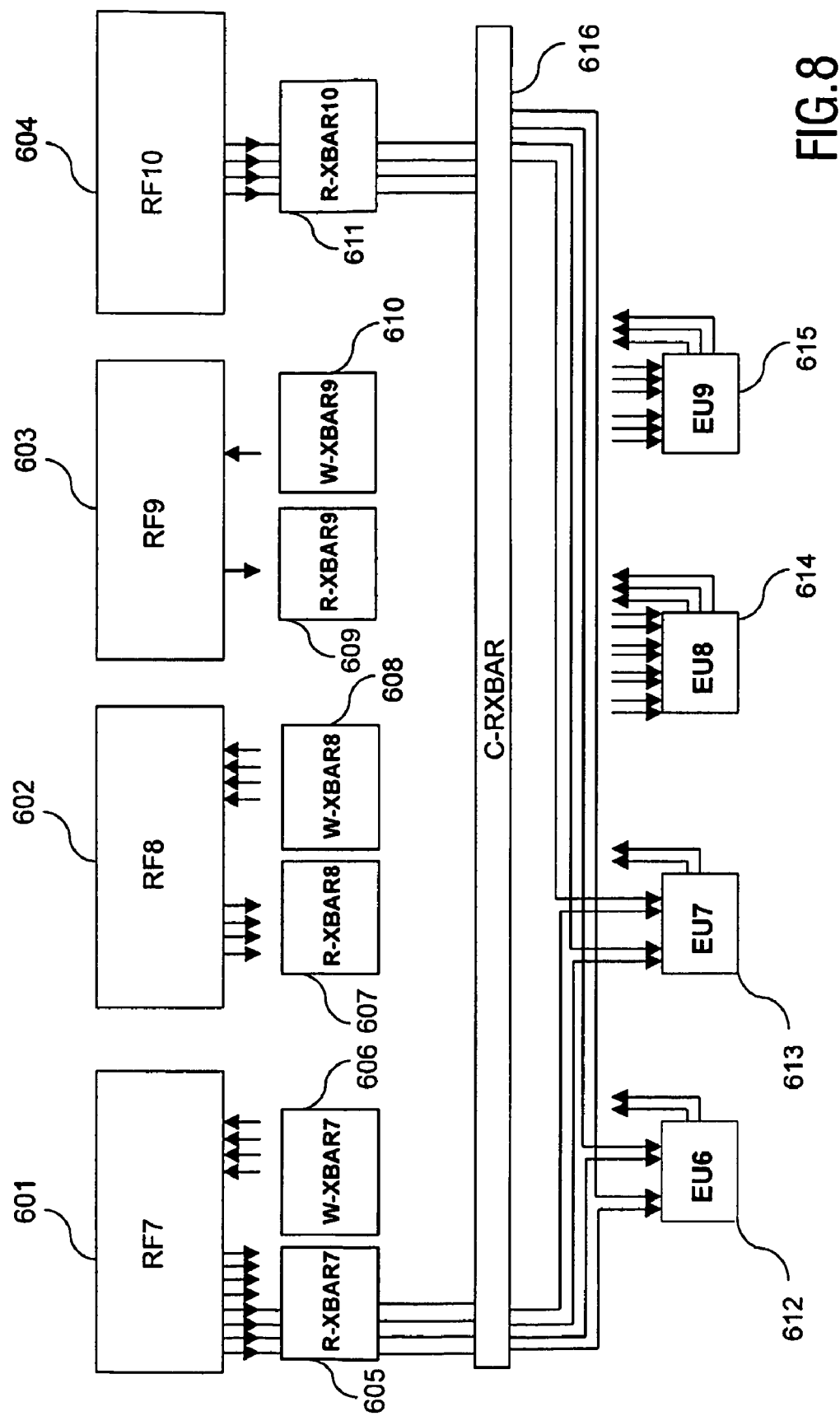

In a third step illustrated in FIG. 8, the following processings are performed simultaneously:
The value (P2−P1) and a first coefficient c1, which is a data item of twelve bits, are sent to first and second input ports of the sixth calculation unit 612.
The value (P3−P2) and a second coefficient c2 are sent to third and fourth input ports of the sixth calculation unit 612.
The value (P4−P3) and a third coefficient c3 are sent to first and second input ports of the seventh calculation unit 613.
The value (P5−P4) and a fourth coefficient c4 are sent to third and fourth input ports of the seventh calculation unit 613.

Next the values c1(P2−P1), c2(P3−P2), c3(P4−P3) and c4(P5−P4) are calculated by the sixth and seventh calculation units 612 and 613.

Figure 9:
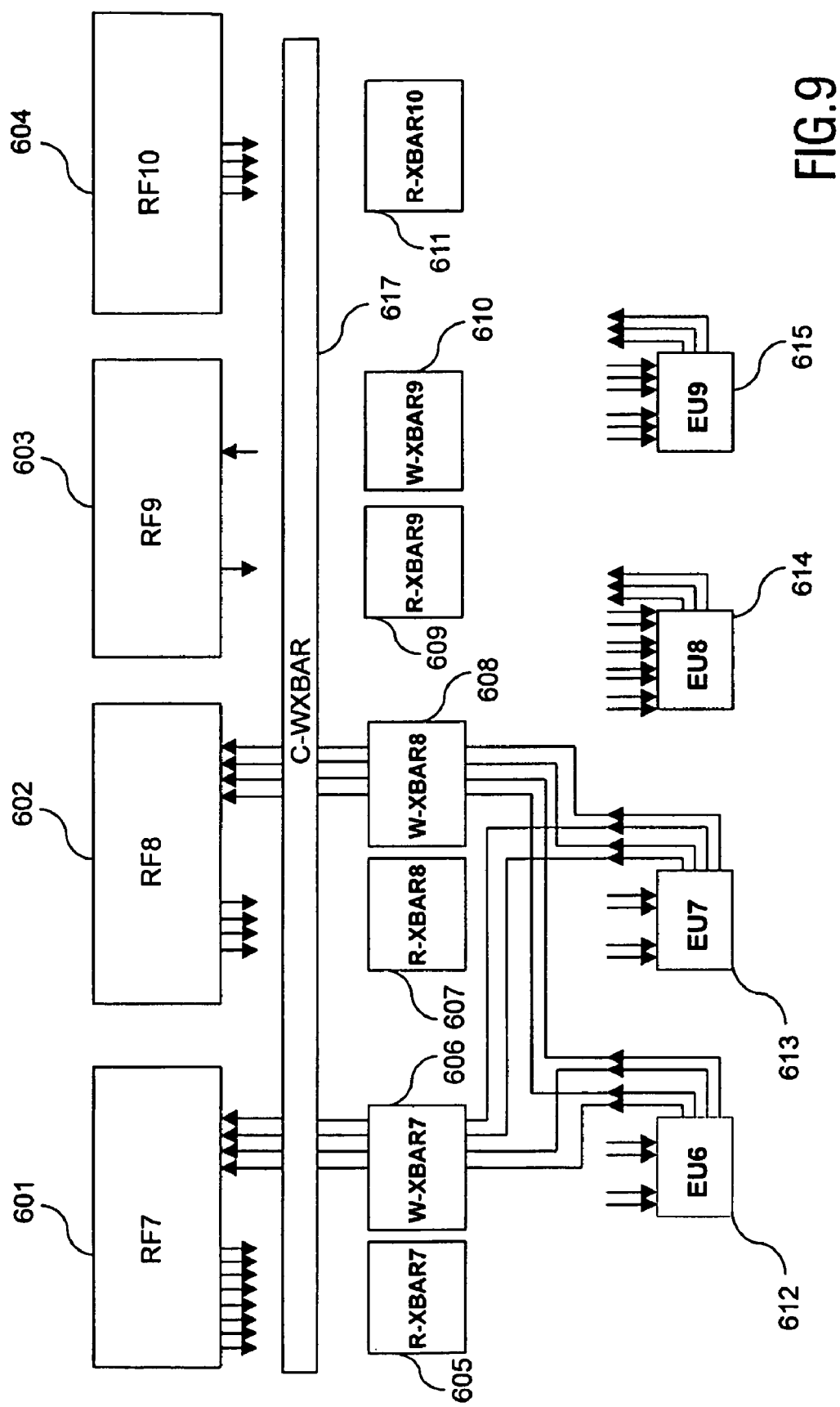

In a fourth step illustrated in FIG. 9, the following processings are performed simultaneously:
The first twelve bits of c1(P2−P1), which is a data item of twenty-four bits, are sent to the first writing port of the seventh bank of registers 601.
The last twelve bits of c1(P2−P1) are sent to the first writing port of the eighth bank of registers 602.
The first twelve bits of c2(P3−P2) are sent to the second writing port of the seventh bank of registers 601.
The last twelve bits of c2(P3−P2) are sent to the second writing port of the eighth bank of registers 602.
The first twelve bits of c3(P4−P3) are sent to the third writing port of the seventh bank of registers 601.
The last twelve bits of c3(P4−P3) are sent to the third writing port of the eighth bank of registers 602.
The first twelve bits of c4(P5−P4) are sent to the fourth writing port of the seventh bank of registers 601.
The last twelve bits of c4(P5−P4) are sent to the fourth writing port of the eighth bank of registers 602.

Figure 10:
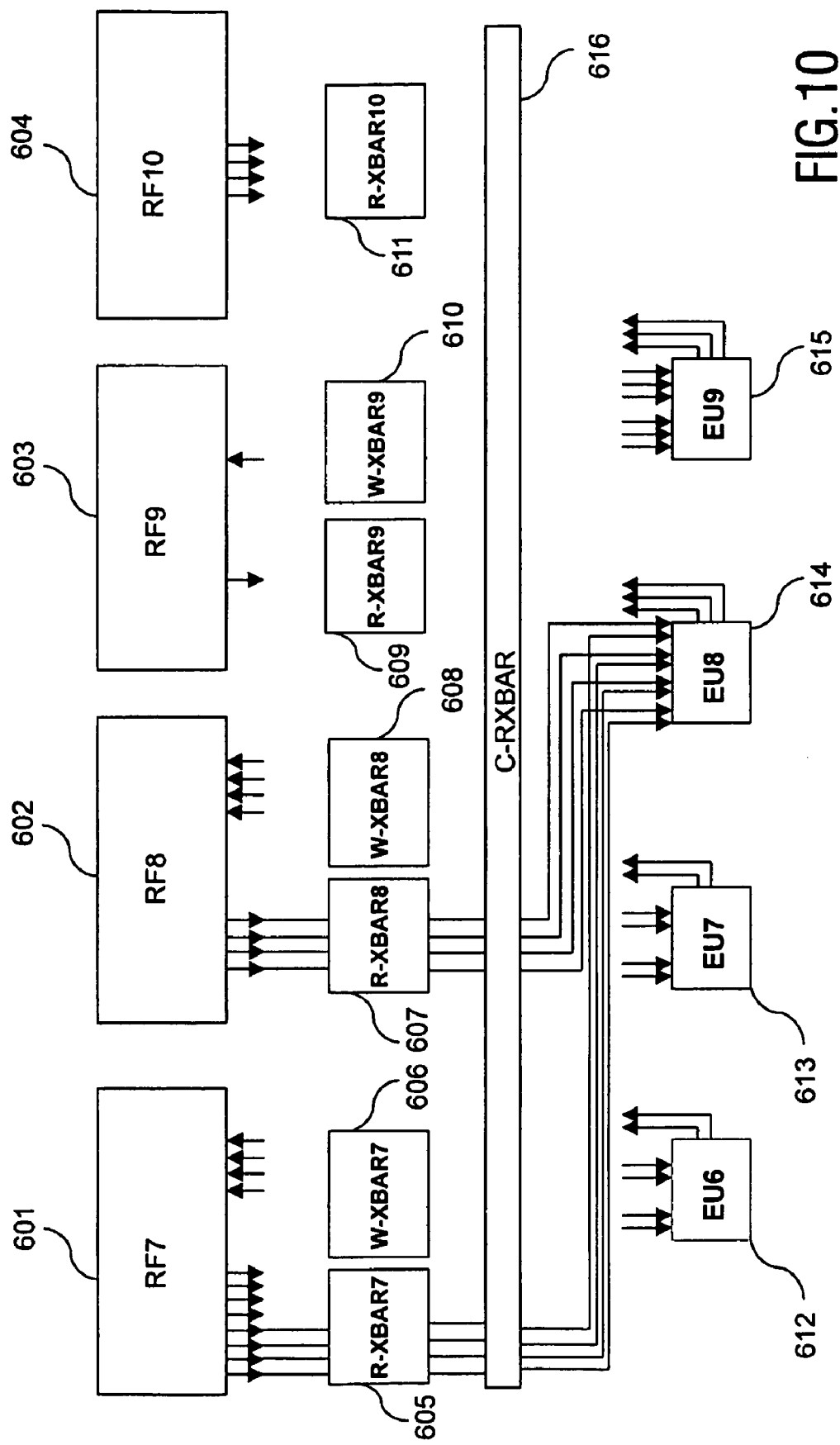

In a fifth step illustrated in FIG. 10, the following processings are performed simultaneously:
The first twelve bits of c1(P2−P1) are sent to the first input port of the eighth calculation unit 614.
The last twelve bits of c1(P2−P1) are sent to the second input port of the eighth calculation unit 614.
The first twelve bits of c2(P3−P2) are sent to the third input port of the eighth calculation unit 614.
The last twelve bits of c2(P3−P2) are sent to the fourth input port of the eighth calculation unit 614.
The first twelve bits of c4(P4−P3) are sent to a fifth input port of the eighth calculation unit 614.
The last twelve bits of c4(P4−P3) are sent to a sixth input port of the eighth calculation unit 614.
The first twelve bits of c5(P5−P4) are sent to a seventh input port of the eighth calculation unit 614.
The last twelve bits of c5(P5−P4) are sent to an eighth input port of the eighth calculation unit 614.

Next the eighth calculation unit calculates the value:

$$P = c1(P2-P1) + c2(P3-P2) + c3(P4-P3) + c4(P5-P4)$$

Figure 11:
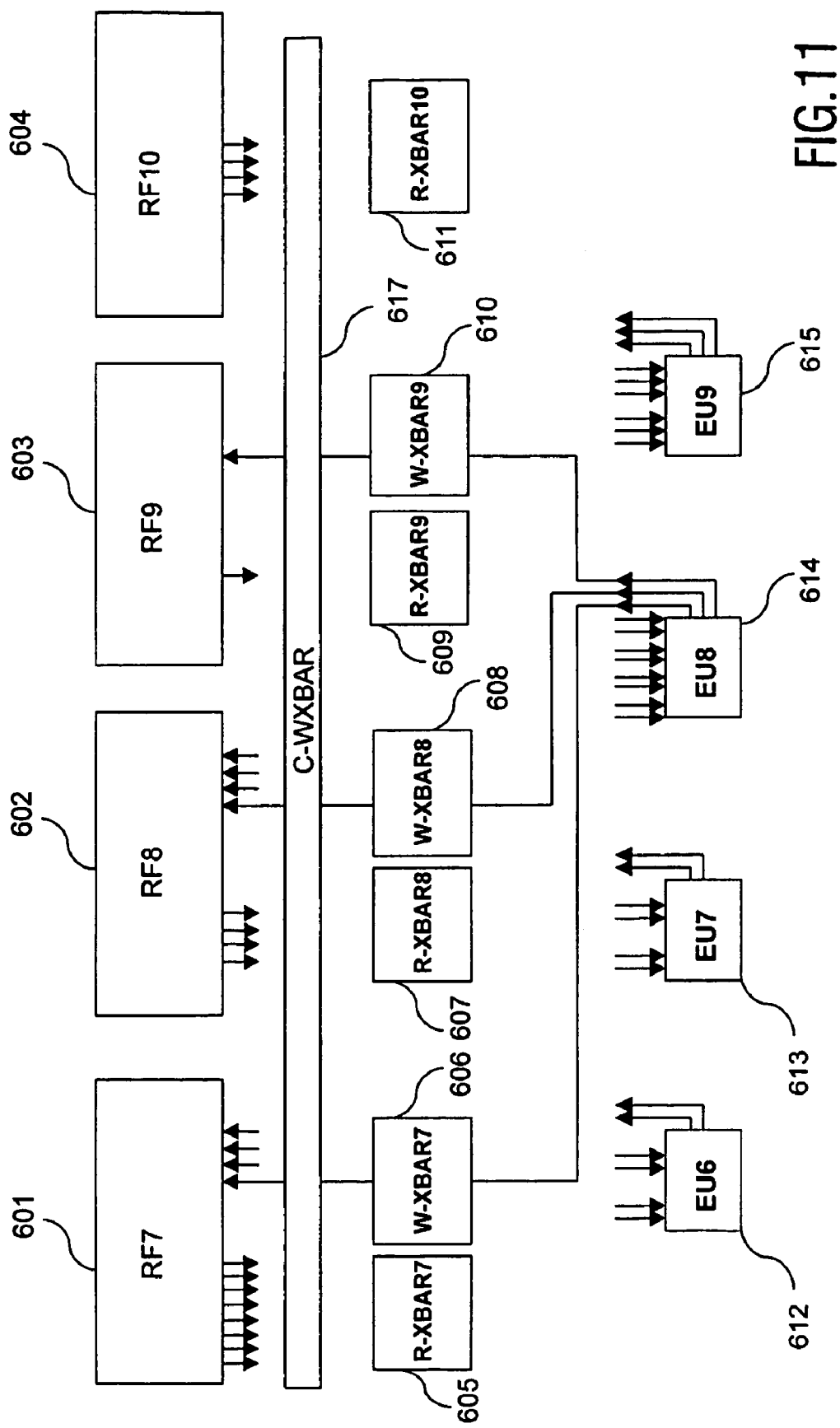

In a sixth step illustrated in FIG. 11, the following processings are performed simultaneously:

The first twelve bits of P, which is a data item of twenty-five bits, are sent to the first writing port of the seventh bank of registers 601.

The following twelve bits of P are sent to the first writing port of the eighth bank of registers 602.

The last twelve bits of P are sent to a first writing port of the ninth bank of registers 603. These last twelve bits in fact comprise only one useful data bit.

A processing system such as the one depicted in FIGS. 6 to 11 can be used in an image reproduction processor intended to calculate pixel values with a view to displaying these pixels on a screen. Such an image reproduction processor can be incorporated, for example, in a decoder, a set-top box, a television, a computer central unit or a computer screen. Such an image reproduction processor can be used in a communication network comprising at least one transmitter able to send signals representing at least one image, a transmission network and a receiver able to receive said signals.

Use of the verb "comprise" and its conjugations does not exclude the presence of elements or steps other than those stated in a claim. Use of the indefinite article "a" or "an" preceding an element does not exclude the presence of a plurality of such elements.

The invention claimed is:

1. A processing system comprising:
   a calculation unit (13), compriseing at least one port;
   a storage device, the storage device comprises several banks of registers (21, 22), wherein a bank of registers stores words of P/N bits, a data item to be communicated being comprised in one or more words, P and N being integer numbers, N being greater than or equal to 2 and P being a multiple of N;
   a system for switching between the storage device and the calculation unit, the switching system comprises at least one switching device (24) associated with each bank of registers and also comprising a common switching device (27) by means of which the port of the calculation unit can communicate with several registers;
   the calculation unit is able to communicate with at least two banks of registers by means of the associated switching devices;
   wherein, at a first time, the calculation unit communicates with i registers for reading or writing a data item of iP/N bits, i being a first integer between 1 and N, and at a second different time, the calculation unit communicates with i registers for reading or writing a data item of iP/N bits, i being a second different integer between 1 and N.

2. A processing system as claimed in claim 1, characterized in that the calculation unit comprises at least one port, said port being able to communicate with a single bank of registers.

3. A processing system as claimed in claim 2, characterized in that each bank of registers stores a data type and the port of the calculation unit is associated with a data type.

4. An image reproduction processor comprising a processing system as claimed in claim 1.

5. A set-top box comprising at least one image reproduction processor as claimed in claim 4.

6. A device comprising at least one screen intended to display images and an image reproduction processor as claimed in claim 4.

7. A communication network comprising at least one transmitter able to send signals representing at least one image, a transmission network, a receiver able to receive said signals and an image reproduction processor as claimed in claim 4.

* * * * *